United States Patent
Kim et al.

(10) Patent No.: US 9,129,178 B2
(45) Date of Patent: Sep. 8, 2015

(54) METHOD AND APPARATUS FOR PROCESSING DATA USING OPTICAL CHARACTER READER

(71) Applicant: Samsung Electronics Co. Ltd., Suwon-si, Gyeonggi-do (KR)

(72) Inventors: Misu Kim, Chilgok-gun (KR); Sunmi Kwon, Gumi-si (KR); Jeongin Choe, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 13/972,329

(22) Filed: Aug. 21, 2013

(65) Prior Publication Data

US 2014/0056522 A1  Feb. 27, 2014

(30) Foreign Application Priority Data

Aug. 23, 2012 (KR) ........................ 10-2012-0092151

(51) Int. Cl.
*G06K 9/18* (2006.01)
*G06K 9/00* (2006.01)

(52) U.S. Cl.
CPC .............. *G06K 9/18* (2013.01); *G06K 9/00993* (2013.01); *G06K 2209/01* (2013.01)

(58) Field of Classification Search
None
See application file for complete search history.

(56) References Cited

U.S. PATENT DOCUMENTS

| 7,647,355 | B2 * | 1/2010 | Best et al. ................. 707/999.2 |
| 2003/0002086 | A1 * | 1/2003 | Thomason .................... 358/448 |
| 2004/0260569 | A1 * | 12/2004 | Bell et al. ........................... 705/1 |
| 2009/0052804 | A1 * | 2/2009 | Lewis ............................ 382/298 |
| 2010/0061655 | A1 * | 3/2010 | Ma ................................ 382/275 |
| 2010/0208308 | A1 | 8/2010 | Park et al. |
| 2010/0296115 | A1 * | 11/2010 | Onishi ............................ 358/1.9 |

* cited by examiner

*Primary Examiner* — Bhavesh Mehta
*Assistant Examiner* — David F Dunphy
(74) *Attorney, Agent, or Firm* — Jefferson IP Law, LLP

(57) ABSTRACT

A method for processing data by using an optical character reader (OCR) is provided. The method includes obtaining OCR data from each image file of a plurality of image files and storing the obtained OCR data, receiving a search command with respect to an object, extracting the object from the stored OCR data, selecting OCR data which includes the object from among the OCR data, and displaying a list of image files which correspond to the selected OCR data.

14 Claims, 14 Drawing Sheets

300

METHOD AND APPARATUS FOR PROCESSING DATA USING OPTICAL CHARACTER READER

CROSS-REFERENCE TO RELATED APPLICATION

This application claims priority from Korean Patent Application No. 10-2012-0092151, filed on Aug. 23, 2012 in the Korean Intellectual Property Office, the disclosure of which is hereby incorporated by reference in its entirety.

BACKGROUND

1. Field

The present invention relates to a method and apparatus for processing data by using an optical character reader (OCR), and more particularly, to a method and apparatus for processing data by using the OCR in a user device which is capable of reducing an OCR recognition time for an object (e.g., a text, a character, etc.) with respect to an image file which is associated with the user device.

2. Description of the Related Art

Recently, along with development of digital technologies, various user devices which are capable of communicating and processing personal information while moving, such as a mobile communication terminal, a personal digital assistant (PDA), an electronic organizer, a smartphone, and a tablet personal computer, are being introduced. Such user devices do not remain in respective traditional unique areas, and are reaching a mobile convergence phase that covers areas of other terminals. For example, a user device may include various functions, such as, for example, a message transmission and reception function including a short message service (SMS)/multimedia message service (MMS), an e-mail, a navigation function, a photographing function, a broadcast replay function, a media (moving image and music) replay function, an Internet function, a messenger function and a social network service (SNS) function.

In particular, a recent conventional user device includes an optical character reader (OCR) function. The OCR function is used for simplifying an input work of data in a user device, and/or for other suitable functions, and represents a function which operates on optically reading handwritten or printed characters. Such an OCR function may more simplify an input work because a character may be directly inputted, unlike a bar code.

Further, a user may obtain an object (e.g., a text or character) via an OCR function in various image files stored in the user device. Here, in the conventional user device, the user may obtain OCR data which is composed of objects by operating the OCR function in a desired image file.

SUMMARY

However, in the conventional user device, when the user tries to obtain an object from within the image file, the recognition process (e.g., OCR function execution process→recognition process→conversion process→display process) should be performed by operating the OCR function every time. In particular, even when OCR data is intended to be obtained for the image file which is recognized by performing the OCR function, the OCR recognition process should be repeated every time. Hence, the user should repeatedly perform several processes for obtaining OCR data for the same image file and thereby experience the waiting time every time. Further, the waiting time increases in proportion to the recognition time of the OCR, which may be very inconvenient to the user.

Exemplary embodiments of the present inventive concept have been made in view of the above problems, and an object of the exemplary embodiments is to provide a method and apparatus for processing data by using an optical character reader (OCR) which is capable of minimizing a drawing time based on an acquisition time of OCR data by quickly obtaining OCR data in a user device.

Another object of the exemplary embodiments is to provide a method and apparatus for processing data by using an OCR which is capable of accurately and quickly providing a result value while not interfering with the user's convenience by minimizing the waiting time by quickly drawing OCR data which relates to a requested object when performing the OCR function with respect to an image file to a user device.

Another object of the exemplary embodiments is to provide a method and apparatus for processing data by using an OCR which is capable of drawing a quick result while not repeatedly performing an OCR process for all image files when extracting only image files which include user-desired objects and listing up in many image files.

Another object of the exemplary embodiments is to provide a method and apparatus for processing data by using an OCR which is capable of matching an OCR process result value of overall image files with an image file, storing the files in advance and quickly providing OCR data for an image file without a need for operating the OCR when performing the OCR process.

Another object of the exemplary embodiments is to provide a method and apparatus for processing data by using an OCR which is capable of improving a convenience of the user and usability of a user device by implementing an optimal environment for minimizing a waiting time for an OCR process in a user device having an OCR function.

In accordance with an aspect of one or more exemplary embodiments, a method for processing data by using an optical character reader (OCR) includes: obtaining OCR data from each image file of a plurality of image files and storing the obtained OCR data; receiving a search command with respect to an object; extracting the object from the stored OCR data; selecting OCR data which includes the object from among the OCR data; and displaying a list of image files which correspond to the selected OCR data.

In accordance with an aspect of one or more exemplary embodiments, a user device includes: a display which is configured to display image files, a list of the image files, and a screen interface for facilitating a reception of a user request to search for an object with respect to optical character reader (OCR) data which relate to the image files; a storage which is configured to store the image files and OCR data which relate to the image files; and a controller which is configured to obtain respective OCR data from each respective image file of the image files, to control the storage to store the obtained respective OCR data, to distinguish OCR data which includes the object from among the stored OCR data when the user request to search for the object is received, and to control the display to display a list of image files which correspond to the distinguished OCR data.

In accordance with an aspect of one or more exemplary embodiments, a non-transitory computer-readable recording medium has recorded a program that obtains from OCR data from each image file of a plurality of image files and stores the obtained OCR data, distinguishes OCR data which includes an object from among the OCR data when a search command with respect to the object is received, processes a display of a list of image files which correspond to the distinguished OCR data, matches respective OCR data with a corresponding image file, and stores a result of the match in at least one of a file area of the corresponding image file and a data area of a storage.

BRIEF DESCRIPTION OF THE DRAWINGS

The objects, features and advantages of the exemplary embodiments will be more apparent from the following detailed description in conjunction with the accompanying drawings, in which.

DETAILED DESCRIPTION OF EXEMPLARY EMBODIMENTS

Figure 1:
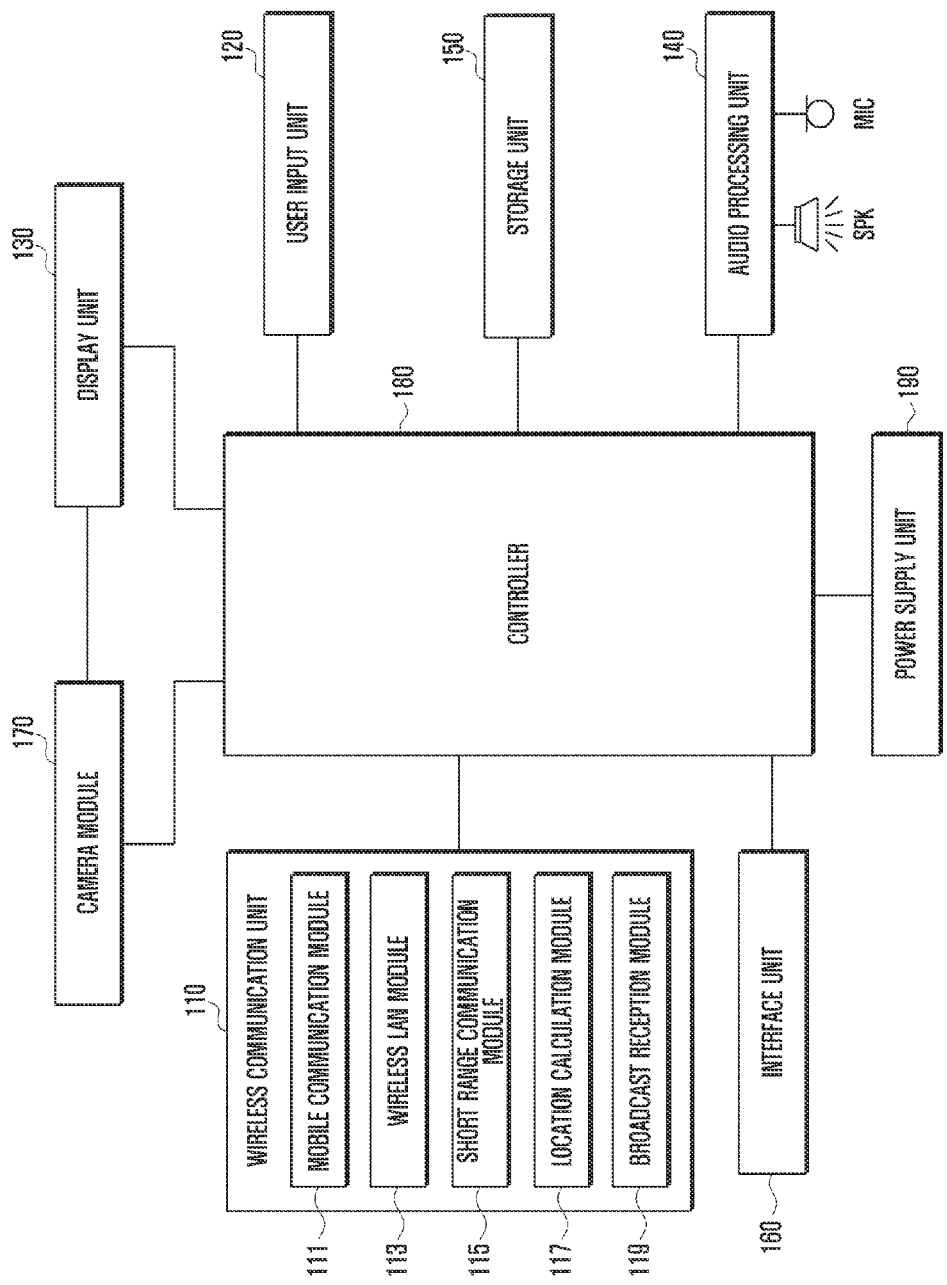
FIG. 1 schematically illustrates a configuration of a user device, according to an exemplary embodiment.

Exemplary embodiments are described with reference to the accompanying drawings in detail. The same reference numbers are used throughout the drawings to refer to the same or like parts. Detailed descriptions of well-known functions and structures incorporated herein may be omitted to avoid obscuring the subject matter of the exemplary embodiments.

The exemplary embodiments relate to a user device having an optical character reader (OCR) function. Particularly, the exemplary embodiments relate to a method and apparatus for reducing OCR recognition time for an object (e.g., a string, a text, etc.) of an image file in the user device.

According to an exemplary embodiment, when trying to obtain an object which is desired by a user by executing the OCR function with respect to many stored image files or trying to extract and list only an image file which includes an object which is desired by the user from among many image files, a result value may be quickly drawn and provided. To this end, OCR data which relates to an image file upon which an OCR process is performed is matched with the image file to be stored.

In an embodiment of one or more exemplary embodiments, the storage may be stored in a particular area (e.g., a file area or a file space, hereinafter, referred to as "file area") of an image file. Further, when the OCR data which is generated for the image file is greater than the storable size of the file area of the image file, a separate storage space of the user device may be secured and stored. Further, when storing the OCR data, the file information which relates to the image file may be matched with the information which relates to the address at which the OCR data is accessible, and then a matching table may be used for storage so that the image file and the OCR data of the image file may be connected, or associated with each other, at the time of storing the OCR data.

Further, in the description below, the image file may represent a file which is obtained by a user device via a camera module, a file which is received by the user device from a content server or another user device, and/or a file which is generated by the user's file conversion (e.g., a format conversion of an image file in a text file). The file area may represent a memory area which is used for recalling information which relates to an image file, and which includes an area in which OCR data may be additionally matched and recorded by using a margin space of the file area. Further, the OCR data represents data which is generated via the OCR process of recognizing the object of an image file by using the OCR function, and may include a text composed of a string or the characters.

Further, the OCR process by the OCR function represents a process of reading each character (e.g., a printed or handwritten character) which is included in an image file by performing a pattern matching and stroke analysis method, and/or any other suitable methodology for recognizing characters optically. For example, the OCR process may include reading characters by features of black and white or stroke shape in a certain graph paper by dividing one character into tens of blocks.

A configuration of a user device and a method for controlling the user device according to an exemplary embodiment will be described with reference to the attached drawings. It should be noted that the configuration of a user device and a method for controlling the user device according to an exemplary embodiment are not limited to the description below, and thus may be applied to various alternative embodiments based on the exemplary embodiments described below.

FIG. 1 schematically illustrates a configuration of a user device, according to an exemplary embodiment.

Referring to FIG. 1, a user device includes a wireless communication unit 110, a user input unit 120, a display unit 130 (also referred to herein as a "display 130"), an audio processing unit 140 (also referred to herein as an "audio processor 140"), a storage unit 150 (also referred to herein as a "storage 150"), an interface unit 160 (also referred to herein as an "interface 160"), a camera module 170 (also referred to herein as a "camera 170"), a controller 180 and a power supply unit 180 (also referred to herein as a "power supply 180"). Components of the user device described in FIG. 1 are not essential, and thus the user device may include more or less components. For example, when a user device according to an exemplary embodiment does not support a separate communication function, the configuration of the wireless communication unit 110 may be omitted.

The wireless communication 110 may include one or more modules that facilitate a wireless communication between a user device and a wireless communication system, or between a user device and a network where another user device is located. For example, the wireless communication unit 110 may include a mobile communication module 111, a wireless local area network (WLAN) module 113, a short range communication module 115, a location calculation module 117, and a broadcast reception module 119. The wireless communication unit 110 may be embodied, for example, as a hardware component which has a wireless communication capability.

The mobile communication module 111 transmits and receives wireless signals with at least one of a base station, an external terminal and a server on a mobile communication network. The wireless signal may include any one or more of various forms of data which relate to transmission and reception of a voice call signal, a video call signal, and/or a text/multimedia message. The mobile communication module 111 may download contents (image file, OCR data, etc.) based on a user selection by connecting to a content service in accordance with a control of the controller 180. The mobile communication module 111 may be embodied as a hardware component, a software module, or a combination of hardware and software.

The wireless LAN module 113 represents a module which is used for connecting to wireless Internet and forming a wireless LAN link with another user device, and may be externally or internally mounted on the user device. A wireless Internet technology may include any one or more of a wireless fidelity (Wi-Fi), a wireless broadband (Wibro), a world interoperability for microwave access (Wimax), and a high speed downlink packet access (HSDPA), etc., and any one or more of these technologies may be used as a wireless Internet technology. The wireless LAN module 113 may download various contents based on a user selection by connecting to a content service in accordance with a control of the controller 180. Further, when a wireless LAN link is formed with another user device, an image file and OCR data which relates to the user selection may be transmitted to or received in another user device. Further, the wireless LAN module 113 may transmit to a cloud service or receive from the cloud server an image file and/or OCR data which relates to the user selection via a wireless LAN. The wireless LAN module 113 may be embodied as a hardware component, a software module, or a combination of hardware and software.

The short range communication module 115 represents a module which is used for short range communication. Any one or more of a Bluetooth, a radio frequency identification (RFID), an infrared data association (IrDA), ultra wideband (UWB), ZigBee and a near field communication (NFC), etc. may be used as short range communication technologies. Further, when a short range communication link is connected with another user device, the short range communication module 115 may transmit to or receive from another user device an image file and/or OCR data, etc. The short range communication module 115 may be embodied as a hardware component, a software module, or a combination of hardware and software.

The location calculation module 117 is a module which is used for obtaining the location of a user device, and a representative example of the location calculation module 117 is a global positioning system (GPS). The location calculation module 117 may calculate three-dimensional accurate time information according to latitude, longitude and altitude by applying trigonometry to the calculated information after calculating distance information and accurate time information with respect to three or more base stations. Further, the location calculation module 117 may obtain location information by continually receiving the current location of the user device from three or more satellites in real time. The location information which relates to the user device may be acquired by various methods. The location calculation module 117 may be embodied as a hardware component, a software module, or a combination of hardware and software.

The broadcast reception module 119 receives a broadcast signal (e.g., a television (TV) broadcast signal, a radio broadcast signal, a data broadcast signal, etc.) and/or information which relates to the broadcast (e.g., a broadcast channel, a broadcast program or information which relates to a broadcast service provider, etc.) via a broadcast channel (e.g., a satellite channel, a ground wave channel, etc.). The broadcast reception module 119 may be embodied as a hardware component, a software module, or a combination of hardware and software.

The user input unit 120 generates input data which is used for controlling an operation of the user device, and the input data is generated in response to actions which are performed by a user with respect to the user input unit 120. The user input unit 120 may include, for example, any one or more of a keypad, a dome switch, a touch pad (constant voltage/constant current), a jog wheel, a jog switch, etc. The user input unit 120 may be implemented in an external button form of a user device, and some buttons may be implemented by a touch panel.

The display unit 130 displays (outputs) information which is processed in the user device. For example, when the user device is being operated in a calling mode, a screen interface such as a user interface (UI) or a graphical UI (GUI) which relates to calling is displayed. Further, when the user device is being operated in a video calling mode or a photographing mode, the user device displays a photographing or/and received image and/or the UI or GUI. In particular, the display unit 130 may display various UIs and GUIs which relate to the operation of the OCR function when operating the OCR function. For example, the display unit 130 may display an image file which is generated by using the camera module 170 to perform photography or is stored in advance, and may display various UIs and GUIs which relate to the OCR process based on the execution of the OCR function with respect to the displayed image file. Further, the display unit 130 may display OCR data which is obtained in the image file or display a list of objects based on a user request, or a list of image files which includes the objects. Further, the display unit 130 may display the progress on the OCR data conversion task that is being performed in the background via particular items (e.g., an icon, a state bar, a text, etc.). The screen example of the display unit 130 which is operated in an exemplary embodiment will be described below.

The display unit 130 may include at least one of a liquid crystal display (LCD), a thin film transistor (TFT) LCD, a light emitting diode (LED), an organic LED (OLED), an active matrix OLED (AMOLED), a flexible display, a bended display, and a 3D display. Some of these displays may be implemented as a transparent display which is composed of a transparent or optical transparent type, such that an external side may be viewed.

Further, when a touch panel that senses a touch operation with respect to the display unit 130 forms a mutual layer structure (hereinafter, referred to as "touch screen"), the display unit 130 may be used as an input device as well as an output device. The touch panel may be configured to convert a change in a pressure which is applied to a particular part of the display unit 130, or a capacitance which is generated in a particular part of the display unit 130, into electric input signals. The touch panel may be configured to detect not only the touched location and area, but also the pressure at the time of the touch. When there is a touch input for the touch panel, the corresponding signals are transmitted to a touch controller (not shown). The touch controller (not shown) processes the signals and transmits the corresponding data to the controller 180. As such, the controller 180 may recognize the touch area of the display unit 130.

The audio processing unit 140 may transmit an audio signal which is received from the controller 180 to a speaker (SPK) and transmit an audio signal, such as a voice signal which is received via a microphone (MIC), to the controller 180. The audio processing unit 140 may convert voice/sound data into audible sounds and output the sounds via the speaker (SPK) based on a control of the controller 180, and convert audio signals, such as sounds received from the microphone (MIC), into digital signals, and then transmit the converted signals to the controller 180.

The speaker (SPK) may output audio data which is received from the wireless communication unit 110 or stored in the storage unit 150 when the user device is being operated in any of various modes, such as, for example, a calling mode, a recording mode, a voice recognition mode, a broadcast reception mode, a photographing mode, etc. The speaker (SPK) may output sound signals which respectively relate to the functions performed in the user device (e.g., a call connection reception, a call connection transmission, an OCR recognition process, a music file replay, etc.).

The microphone (MIC) receives external sound signals and processes the received sound signals as electric voice data when the user device is being operated in any of various modes, such as, for example, a calling mode, a recording mode, a voice recognition mode, a photographing mode, etc. The processed voice data may be converted into a form that is transmittable to a mobile communication base station via the mobile communication module 111 and then be outputted. Various noise removing algorithms for removing noises generated in the process of receiving external sound signals may be implemented in the microphone.

A program for processing and controlling the controller 180 may be stored, and a function for temporarily storing inputted/outputted data (e.g., an image file, an OCR data, an object, a phone number, a message, an audio file, a moving image file, an electric book, etc.) may be performed. The storage unit 150 may store a use frequency based on a respective operation of a user device function (e.g., an image file use frequency, an application use frequency, a phone number, a message, a use frequency on a multimedia file, etc.), an importance, and/or a priority. The storage unit 150 may also store data which relates to vibration and sounds of various patterns outputted at the time of a touch input on a touch screen. In particular, the storage unit 150 includes a data area, and respective OCR data which is matched with a corresponding image file via the data area may be stored. Here, the storage unit 150 may store a mapping table in which the file information which relates to the image file is matched with the information which relates to the address at which the respective OCR data is stored so that the image file may be connected and/or associated with the OCR data of the image file.

The storage unit 150 may include at least one of storage media from among memories such as, for example, a flash memory type, a hard disk type, a micro type and a card type (SD card or XD card), a random access memory (RAM), a static RAM (SRAM), a read only memory (ROM), a programmable ROM (PROM), an electrically erasable PROM (EEPROM), a magnetic RAM (MRAM), a magnetic disk, and an optical disk. The user device may be linked with the web storage for performing the storage function of the storage unit 150 in the Internet.

The interface unit 160 serves as a path or conduit with respect to all external devices which are connected to the user device. The interface unit 160 may receive data or may be supplied power from an external device and then transmit the data or power to each internal component of the user device, or may facilitate a transmission of internal data of the user device to an external device. For example, any one or more of a wired/wireless headset port, an external charger port, a wired/wireless data port, a memory card port, a port that connects a device including an identification module, an audio input/output port, a video input/output port, an earphone port, etc. may be included in the interface unit 160.

The camera module 170 indicates a configuration of supporting a photographing function of the user device. In particular, the camera module 170 may be used to perform photographing of a still image and a moving image of a subject. The camera module 170 may photograph an arbitrary subject and transmit photographed image data to the display unit 130 and the controller 180 based on a control of the controller 180. For example, the camera module 170 may include an image sensor (or camera sensor) that converts an inputted optical signal into an electric signal, and an image signal processor that converts electric signals which are received from the image sensor into digital image data. The image sensor may include a sensor that uses a scheme, such as, for example, any one or more of a charge-coupled device (CCD) and a complementary metal oxide semiconductor (CMOS).

The controller 180 controls an overall operation of the user device. For example, a control which relates to any one or more of a voice call, a data communication and a video call may be performed. In particular, the controller 180 controls an overall operation which relates to reducing an OCR recognition time with respect to an object (e.g., a string, a text, etc.) of an image file in an exemplary embodiment. Further, the controller 180 may perform a control which relates to the process of the OCR function (e.g., a background process) on the photographed function and the photographed image. Further, the controller 180 may include a multimedia module (not shown) for performing a replay of a multimedia file. In an exemplary embodiment, the multimedia module (not shown) may be implemented within the controller 180, or may be implemented separately from the controller 180.

According to an exemplary embodiment, the controller 180 may obtain and store respective OCR data from each image file. In particular, the controller 180 may store the respective OCR data in the file area of the image file based on the size of the OCR data when the OCR data is stored, or may control the storage 150 to store the OCR data by matching the OCR data with the image file in the data area of the storage unit 150. For example, when the size of the OCR data is less than or equal to the size of the image file, the OCR data may be stored in the file area of the corresponding image file, and if the size of the OCR data is greater than the size of the file area of the image file, the OCR data may be controlled to be matched with the image file in the data area of the storage unit 150 and be then stored.

Further, when a search command and/or a search request which relates to a search for a particular object is received with respect to a plurality of image files, OCR data which include the search-requested object are distinguished from among the OCR data, and at least one image file which corresponds to the distinguished OCR data may be extracted. Further, the controller 180 may include the extracted image file for generation of a list and control the list to be displayed on the screen interface via the display unit 130. Further, the controller 180 may distinguish an image file which includes OCR data from an image file which does not include OCR data when executing the OCR function, and select at least one image file which does not include OCR data as a subject image file for performing the OCR process, and control the OCR process to be performed only with respect to the selected subject image file.

The detailed control operation of the controller 180 will be described below in conjunction with an example of operation of the user device and the control method thereof with reference to the drawings.

The power supply unit 190 is supplied external power and internal power based on a control of the controller 180, and supplies power which is required for operation of each component.

Further, various exemplary embodiments which are described herein may be implemented within a recording medium which is readable by a computer or a similar device using software, hardware or a combination thereof. According to a hardware implementation, the exemplary embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, one or more exemplary embodiments may be implemented by the controller 180 itself. In a software implementation, one or more exemplary embodiments which include procedures and functions as described in the present disclosure may be implemented as separate software modules. Each of the software modules may perform one or more functions and operations as described in the present disclosure.

In particular, the recording medium may include a computer-readable recording medium having recorded thereon a program for obtaining OCR data from each image file of a plurality of image files and storing the OCR data, distinguishing OCR data which includes an object when receiving a search command and/or a search request with respect to the object, processing a display of a list of the image files which correspond to the OCR data, matching respective OCR data with a corresponding image file, and storing a result of the matching in at least one of the file area of the image file and/or the data area of the storage unit, based on the size of the OCR data.

Further, the user device of FIG. 1 may include any one or more of devices that use an application processor (AP), a graphic processing unit (GPU), and/or a central processing unit (CPU), such as all information communication devices, multimedia devices and their application devices that support the functions of the exemplary embodiments. For example, the user device may include devices such as, for example, any one or more of a tablet personal computer, a smart phone, a digital camera, a portable multimedia player (PMP), a media player, a portable game console, and a personal digital assistant (PDA), as well as mobile communication terminals which are operated according to respective communication protocols which correspond to various communication systems. Further, the method for controlling the functions of the exemplary embodiments may be applied to various display devices such as a digital television, a digital signage (DS), and a large format display (LFD).

Figure 2:
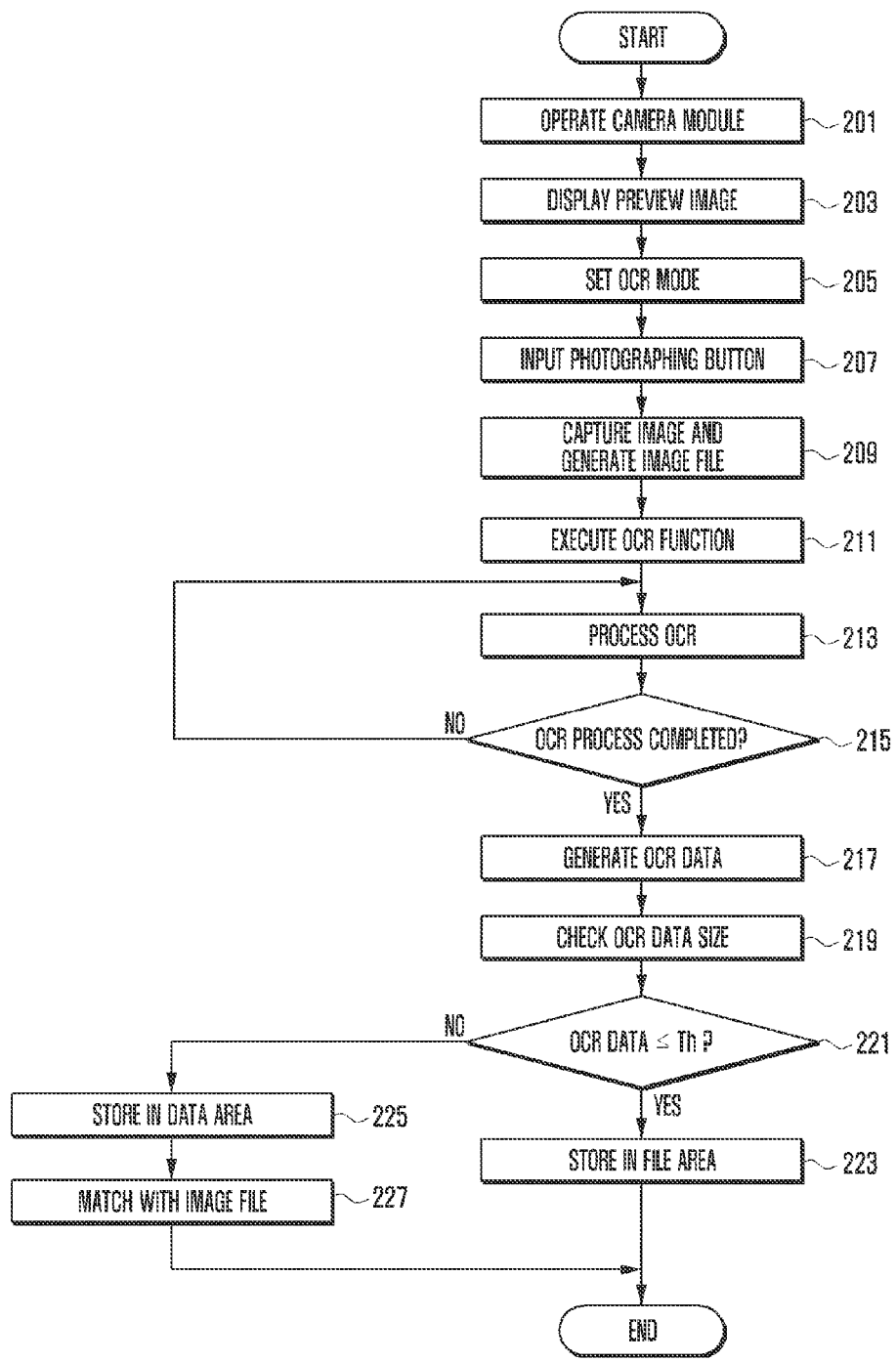
FIG. 2 is a flowchart which illustrates a method for operating an optical character reader (OCR) in a user device, according to an exemplary embodiment.

FIG. 2 is a flowchart which illustrates a method for operating an optical character reader (OCR) in a user device, according to an exemplary embodiment.

In particular, FIG. 2 shows an operation example of setting an OCR mode and photographing a subject by using a camera module 170, and an operation example of generating OCR data by performing photographing while operating in the OCR mode.

Referring to FIG. 2, in operation 201, an operation command of the camera module 170 is received via the user input unit 120 and/or the display unit 130, the controller 180 operates the camera module 170, and an image which is obtained via the camera module 170 is processed. In operation 203, a preview mode in which the preview image is displayed in the display unit 130 may be controlled and/or executed.

In operation 205, the controller 180 may set an OCR mode based on a selection while displaying the preview image according to the preview mode. For example, if a photographing option is requested based on a received user input while displaying the preview image, a pop-up display (e.g., a photographing option menu) for setting various options is provided, and the option (in particular, an OCR mode) which is selected by user with respect to the pop-up display may be set to the photographing option.

In operation 207, the controller 180 may receive a photographing button input from the user while displaying a preview image after the OCR mode is set. For example, after setting the OCR mode, the user may provide an input via a photographing button that commands photographing via the user input unit 120 or the display unit 130.

If the photographing button input is received, in operation 209, the controller 180 captures the preview image being displayed, and generates an image file. In particular, the controller 180 captures the preview image which is displayed as a preview via the display unit 130, and stores the captured image as an image file in a particular format.

In operation 211, the controller 280 executes the OCR function at the time of generating an image file, and then, in operation 213, the controller 180 controls the OCR process with respect to the generated image file. For example, the controller 180 may perform a process of reading each character which is included in an image file by executing any one or more of a pattern matching or stroke analysis method. At this time, the progress or completion status of the OCR process is tracked in a background, and a preview image which is transmitted via a camera module 170 may be displayed on the display unit 130.

The controller 180 checks the progress according to the OCR process, and confirms whether the OCR process is completed in operation 215.

When OCR process is not completed (as indicated by NO with respect to operation 215), the controller 180 may continue to control the OCR process as in operation 213. At this time, the OCR process may be performed in a background. When the OCR process is completed (as indicated by YES with respect to operation 215), in operation 217, the controller 180 generates OCR data for the image file. At this time, the controller 180 may buffer the generated OCR data.

In operation 219, when OCR data which corresponds to the image file is generated, the controller 180 may check the size of the OCR data, and then, in operation 221, the controller 180 compares the size of the OCR data with the size (i.e., Th) of the file area of the image file. In this manner, the controller 180 may determine whether the size of the buffered OCR data is small enough to be stored in the file area of the image file.

If the size of the OCR data is less than or equal to the size of the file area (as indicated by YES with respect to operation 221), in operation 223, the controller 180 may store the OCR data in the file area.

If the size of the OCR data is greater than the size of the file area (as indicated by NO with respect to operation 221), in operation 225, the controller 180 may store the OCR data in the data area of the storage unit 150. Further, in operation 227, the controller 180 may match the image file with the address at which the OCR data is stored in the data area. For example, the controller 180 may update the mapping table in which the image file is matched with the address of the OCR data.

As considered with reference to FIG. 2, according to an exemplary embodiment, when operating the photographing function, the user device may automatically execute the OCR function, generate OCR data which relates to the OCR recognition of the photographed image, and store the generated OCR data, which will be described below with reference to FIGS. 3, 4, 5, 6, 7, and 8.

FIGS. 3, 4, 5, 6, 7, and 8 illustrate an operation of generating OCR data while photographing a subject in a user device, according to an exemplary embodiment.

Referring to FIGS. 3 to 8, FIG. 3 shows a screen example of a user device when a user device is displaying a preview image. For example, when an operation command of the camera module 170 is received based on a control command which is inputted by a user, the camera module 170 is controlled so that the screen, which is in a state during which the operation of the preview mode is being performed, may be provided.

Figure 3:
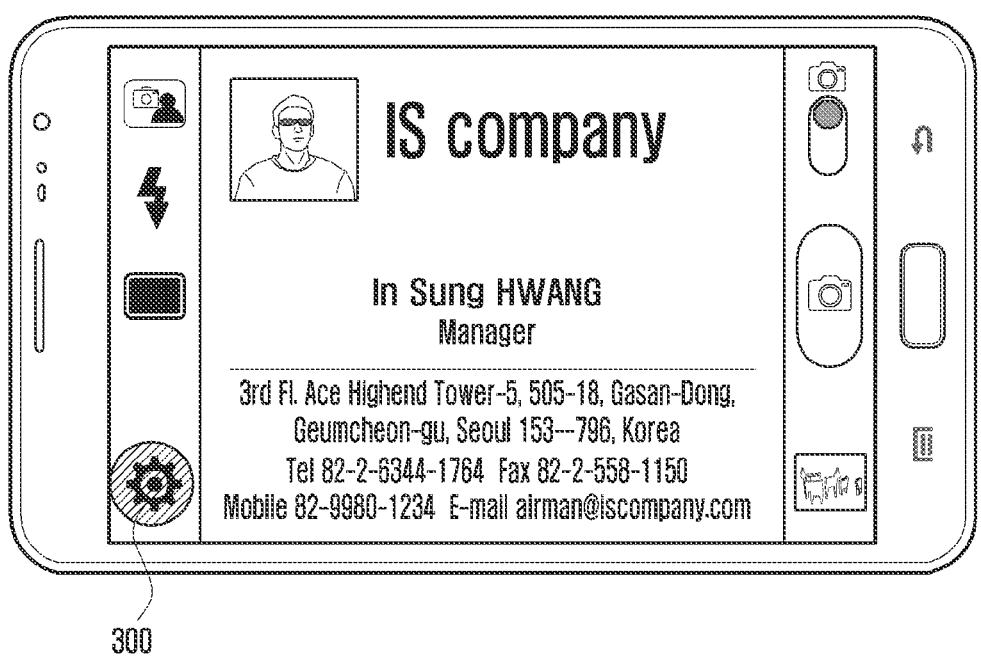
FIGS. 3, 4, 5, 6, 7, and 8 respectively illustrate an operation of generating OCR data while photographing a subject in a user device, according to an exemplary embodiment.
Figure 4:
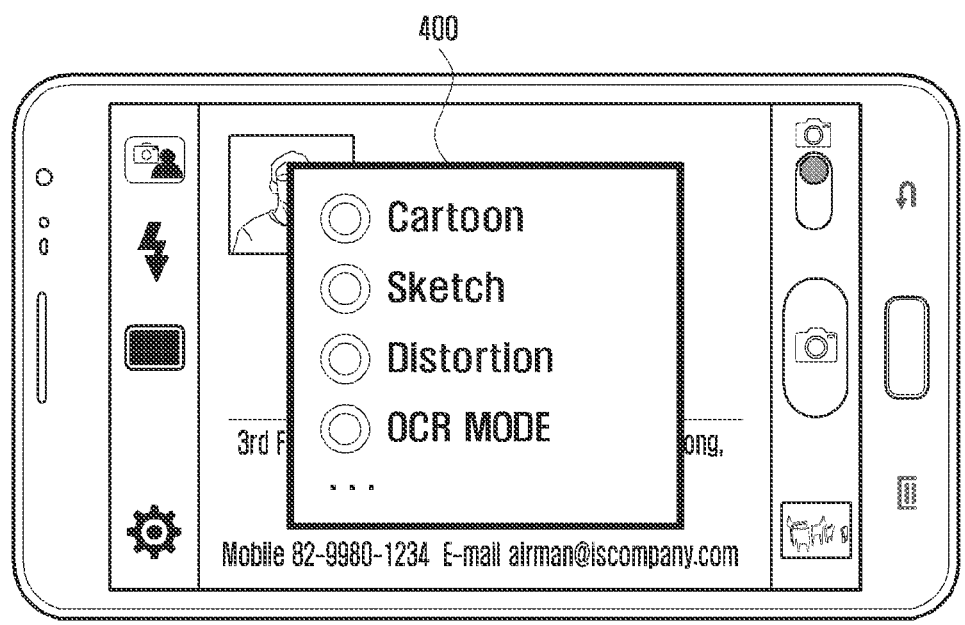

In a state in which the preview image is displayed, the user may input a selection event that selects a setting item 300 (or icon) for setting a photographing option in a screen on which the preview image is displayed, as illustrated in FIG. 3. For example, referring also to FIG. 4, the user may command calling of the photographing option menu 400 by selecting (touching) the setting item (or icon) 300 which indicates the option setting on the screen on which the preview image is displayed. Then if a selection event (touch) is inputted in the setting item 300, the user device may display, on the screen, the photographing option menu 400 which allows setting of the photographing option, as illustrated in FIG. 4. In particular, FIG. 4 illustrates a screen example in a state in which the photographing option menu 400 for selecting various photographing options is displayed on a screen on which the preview image of the user device is displayed.

According to an exemplary embodiment, the user may set any one or more of various photographing options, such as, for example, an OCR mode, a sketch, shade, distortion, composition, animation, vignetting, vintage, color conversion, pastel, and noctilucence. Such a photographing option may be implemented in a plug-in form and be added or deleted based on the user's selection. Further, the function menu for connecting to the service for downloading the photographing option via the photographing option menu 400 may be provided, and the user may connect to the service for downloading the photographing option in the photographing mode by selecting the function menu.

Figure 5:
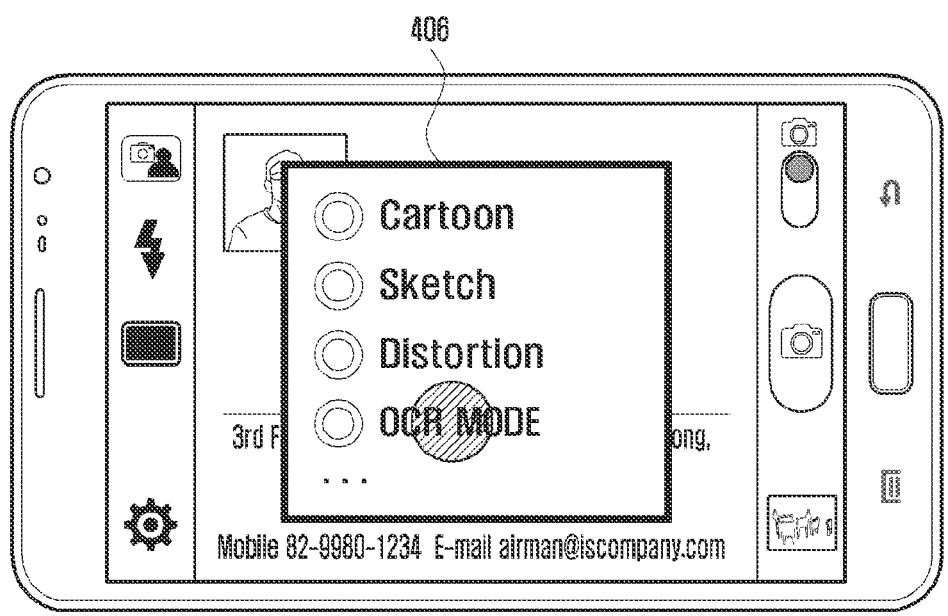

Further, the user may input a selection event of selecting an option item which is intended to be set as illustrated in FIG. 5 with respect to a screen on which the photographing option menu 400 is displayed. For example, the user may input a selection event (touch) of selecting the OCR mode option from among various photographing options which are provided via the photographing option menu 400 as illustrated in FIG. 5. Further, the user may complete the setting of the option after selecting the option item intended to be set. Further, if a selection event input of selecting the option from the user is sensed in the photographing option menu 400, the user device may automatically complete the option setting.

Figure 6:

If the setting of the photographing option (particularly, the OCR mode option) is completed, the user device may display a preview image by proceeding to the preview mode, as illustrated in FIG. 6. In particular, the screen of the user device as shown in FIG. 5 may be converted into the screen as shown in FIG. 6 based on the input of the option item selection event.

The user may input the photographing button to perform photographing in a state in which the preview image is displayed as a preview as illustrated in FIG. 6. If the photographing button is inputted, the user device may display a screen as shown in either of FIG. 7 or FIG. 8 based on the setting state (activation or deactivation) of the review mode or the quick view mode.

Figure 7:
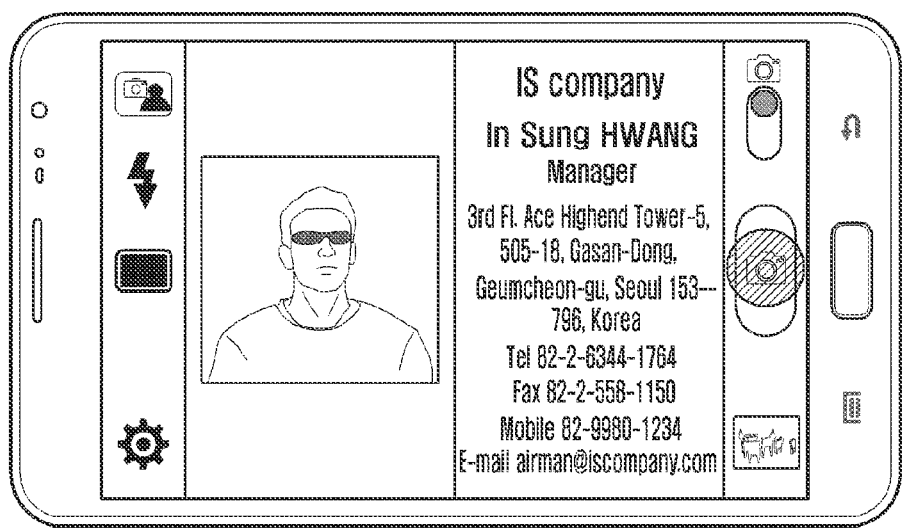

In particular, when the review mode is set as activation, the screen shown in FIG. 6 is converted into a screen shown in FIG. 7 based on the input of the photographing button. For example, the user device may perform the OCR process for recognizing the object (e.g., a string, a text, etc.) by capturing a preview image and performing the OCR function with respect to the captured image (i.e., the image file being buffered). Further, the user device may generate the OCR data based on the recognized object and display the generated OCR data on the screen as illustrated in FIG. 7. FIG. 7 illustrates a screen example in a state in which the OCR-processed result for the image file being buffered is displayed. For example, as illustrated in FIG. 7, the thumbnail image of the capture image may be distinguished from the recognized object so that the OCR data is displayed. In particular, the OCR data which is generated as a result of the photographing may be automatically stored in the file area or data area based on the size of the data when OCR data is generated by using the setting method, and then may be displayed as in FIG. 7, or in a state in which the review mode is displayed as in FIG. 7, if the user selects storage, the OCR data may be manually stored in either of the file area or the data area.

Figure 8:
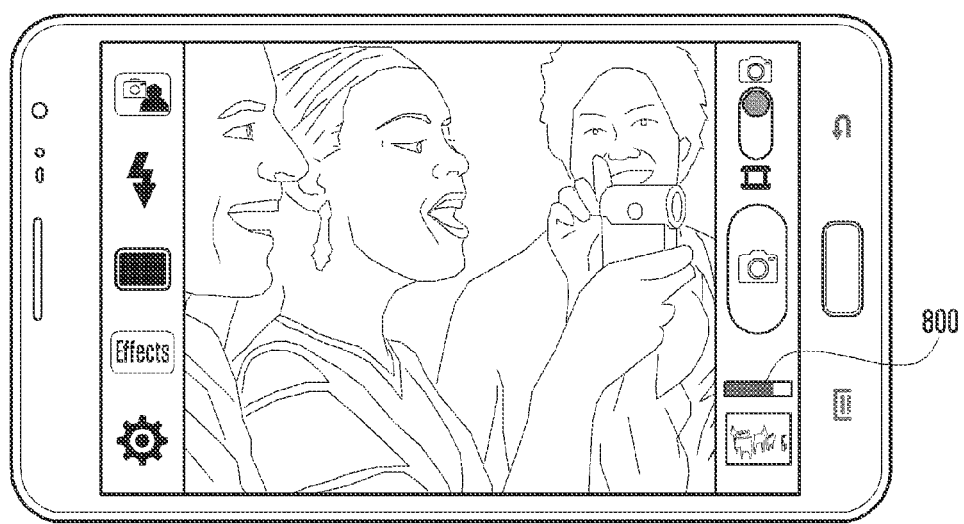

Further, when the quick view mode is set as activation, the screen shown in FIG. 6 is converted into the screen shown in FIG. 8 based on the input of the photographing button. For example, the user device may return to the preview operation and display the screen where the preview image is displayed according to the preview mode as illustrated in FIG. 8. FIG. 8 illustrates a screen example of the user device when the user device displays a new preview image as a preview.

Specifically, if the input of the photographing button is received in a screen display state as shown in FIG. 6, the OCR recognition operation of recognizing the characters in the image file being buffered may be processed in a background. Further, the user device may display the preview image which is obtained via the camera module 170 on the screen by returning to the preview mode while processing the OCR recognition operation in a background. In particular, as illustrated in FIG. 8, the state item 800 (e.g., an icon, a state bar, a text, etc.) which indicates the progress or completion status according to the background process may be provided in one area of the screen at which the preview image is displayed as a preview.

Likewise, according to an exemplary embodiment, when the review mode is set to activation, the UI or GUI which relates to the OCR process is displayed, and when the OCR process is completed, the generated OCR data is displayed.

Further, when the quick mode activation is set, the OCR process is processed in a background and is simultaneously returned to the preview mode so that the next photographing may be quickly performed. In particular, when the quick mode is set to activation, the preview image by preview mode conversion is displayed, and the OCR process operation for recognizing characters of the image file photographed in parallel may be processed in a background. Thereafter, when the OCR process of the background is completed, the user device may store the OCR data which has been processed as a background in either of the file area of the image file or the data area of the storage unit 150 based on the size of the OCR data.

Likewise, the user device according to an exemplary embodiment may remove the user-waiting operation until the image which is obtained in the camera module 170 is sensed and captured, i.e., the photographing button is inputted and the next photographing becomes possible, by processing the OCR recognition operation for the photographed image file as a background and returning to the preview mode at the same time. As such, the user may promptly perform the next photographing operation without waiting, even in a photographing operation in which a delay time occurs due to OCR recognition. Accordingly, the next photographing operation may be promptly performed without delay.

Further, in order to simultaneously perform the OCR process in the background and the preview mode, the first buffer (not shown) for buffering the preview image and second buffer (not shown) for buffering the image file which is the OCR process object may be provided. As such, the user device may control the preview image to be temporarily stored in the first buffer, and control the image file to be temporarily stored in the second buffer. Further, the user device may control the preview image of the first buffer to be outputted in the display unit 130 when operating in the quick mode, and control the image file of the second buffer to be stored in the file area or data area by performing an OCR process for the image file in a background.

The operation of generating OCR data by the executing the OCR function has been illustrated at the time of photographing in FIGS. 2 to 8, but the exemplary embodiments are not limited thereto. Hence, according to one or more exemplary embodiments, OCR data may be obtained by executing the OCR function for an image file which has been previously stored in the user device and for an image file which is obtained from an external server, and/or from any other suitable source, as well as at the photographing time point.

Figure 9:
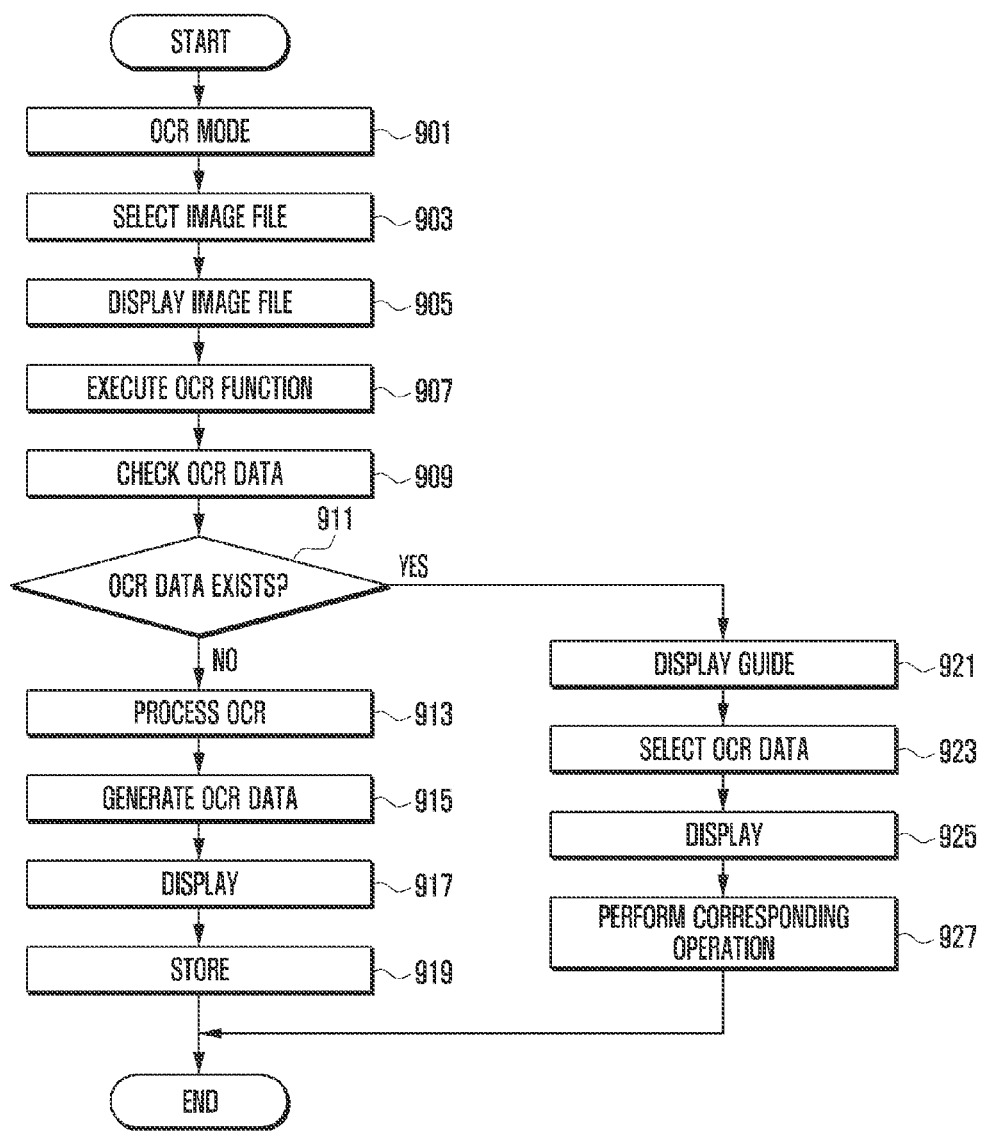
FIGS. 9, 10, 11, and 12 are flowcharts which respectively illustrate a method for operating an OCR function in a user device, according to an exemplary embodiment.

FIG. 9 is a flowchart which illustrates a method for operating the OCR function in a user device, according to an exemplary embodiment.

In particular, FIG. 9 shows an operation example of operating an OCR function based on whether OCR data exist for a particular image file when a user executes the OCR function for the particular image file.

Referring to FIG. 9, in operation 901, if execution of the OCR mode is indicated by an input which is received from a user, the controller 180 may execute the OCR function, and in operation 903, the controller 180 receives a selection of one image file. For example, when executing the OCR mode, the controller 180 may display the list of image files (hereinafter, referred to as "image file list"), and may receive an input which indicates a selection of one image file from the image file list.

If an image file is selected, in operation 905, the controller 180 may display the selected image file on the screen of the display unit 130, and in operation 907, the controller 180 may control the execution of the OCR function. In particular, the execution of the OCR function may be automatically executed by the OCR mode, or may be executed based on the user's selection.

In operation 909, the controller 180 may check the OCR data which is stored in advance when executing the OCR function, and in operation 911, the controller 180 may confirm whether there is OCR data which corresponds to the selected image file. For example, the controller 180 may check the file area of the selected image file when executing the OCR function. Further, if there is not OCR data in the file area, it is possible to determine whether there is OCR data which has been matched with the image file in the data area with reference to the mapping table.

Figure 14:
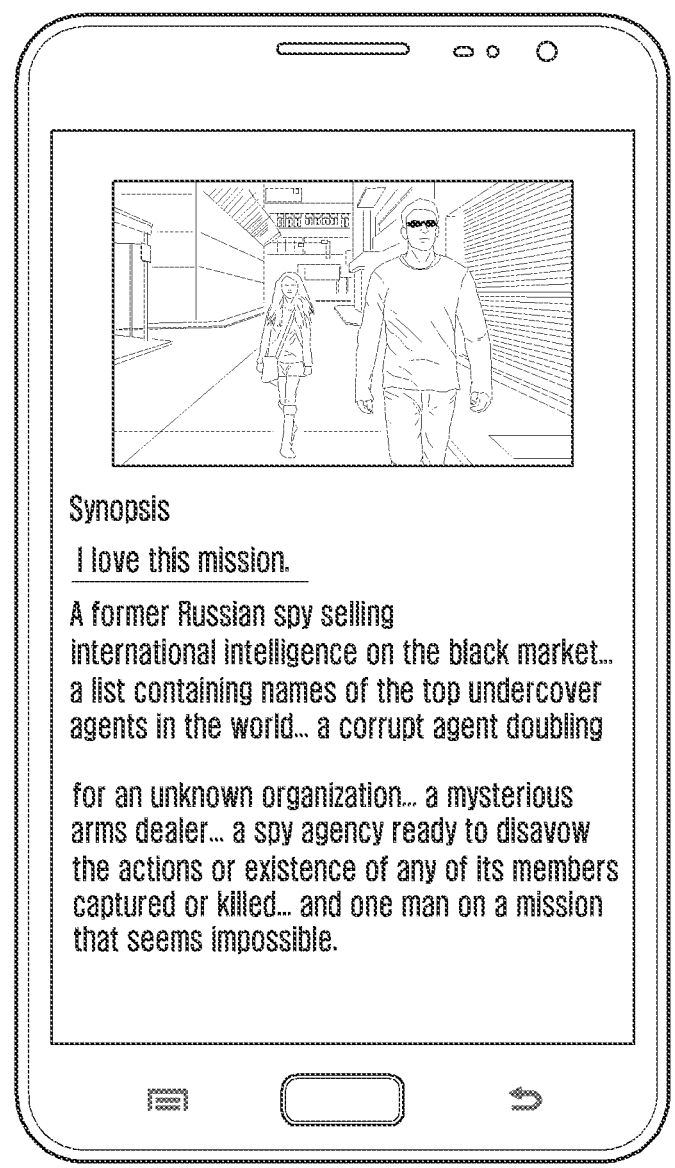

If there is no OCR data which corresponds to the selected image file (as indicated by NO with respect to operation 911), in operation 913, the controller 180 may perform an OCR process with respect to the image file, and in operation 915, the controller 180 may control a generation of OCR data according thereto. Further, in operation 917, the controller 180 may display the generated OCR data, and in operation 919, the controller 180 may control storage of the OCR data based on the user's selection with respect to storage. Here, the OCR data may be stored in the data area of the storage unit 150 or the file area of the image file based on the size of the OCR data. Further, the OCR data may be matched with the image file and be stored. Here, the OCR data may be displayed, including the thumbnail image which corresponds to the image file and the object extracted from the image file as shown in FIG. 7 or FIG. 14.

If there is OCR data which corresponds to the selected image file (as indicated by Yes with respect to operation 911), in operation 921, the controller 180 may control a display of the guide. For example, the controller 180 may control a pop-up output which indicates the existence of OCR data for the selected image file. At this time, an exemplary embodiment may provide a menu for selecting the display of the OCR data and a menu for newly starting the OCR recognition for the image file, etc.

After displaying the guide, if the display of the OCR data is selected in operation 923, the controller 180 may display the OCR data in operation 925, and control the execution of the operation based on the user's request in operation 927. For example, the controller 180 may edit OCR data, save the data as another name, and process the OCR recognition on the image file based on the user's request in a state in which the OCR data is displayed. In particular, in an exemplary embodiment, when there is OCR data which corresponds to the selected image file, operations 921 and 923 may be omitted, and operation 925 of displaying the OCR data may be promptly performed. Further, the OCR data which includes the thumbnail image and the object which corresponds to the image file may be displayed as shown in FIG. 7 or FIG. 14.

Further, FIG. 9 illustrates operations which correspond to OCR mode execution, image file selection, image file display and OCR function execution process, as in shown in operations 901, 903, 905, and 907. However, the exemplary embodiments are not limited thereto, and thus a method of executing the OCR function with respect to a particular image file may be variously performed. For example, the user may execute the OCR function for the selected image file after selecting the image file in a state where the image file list is displayed, or may execute the OCR function for the selected image file by selecting the image file after executing the OCR mode in a state where the image file list is displayed.

Figure 10:
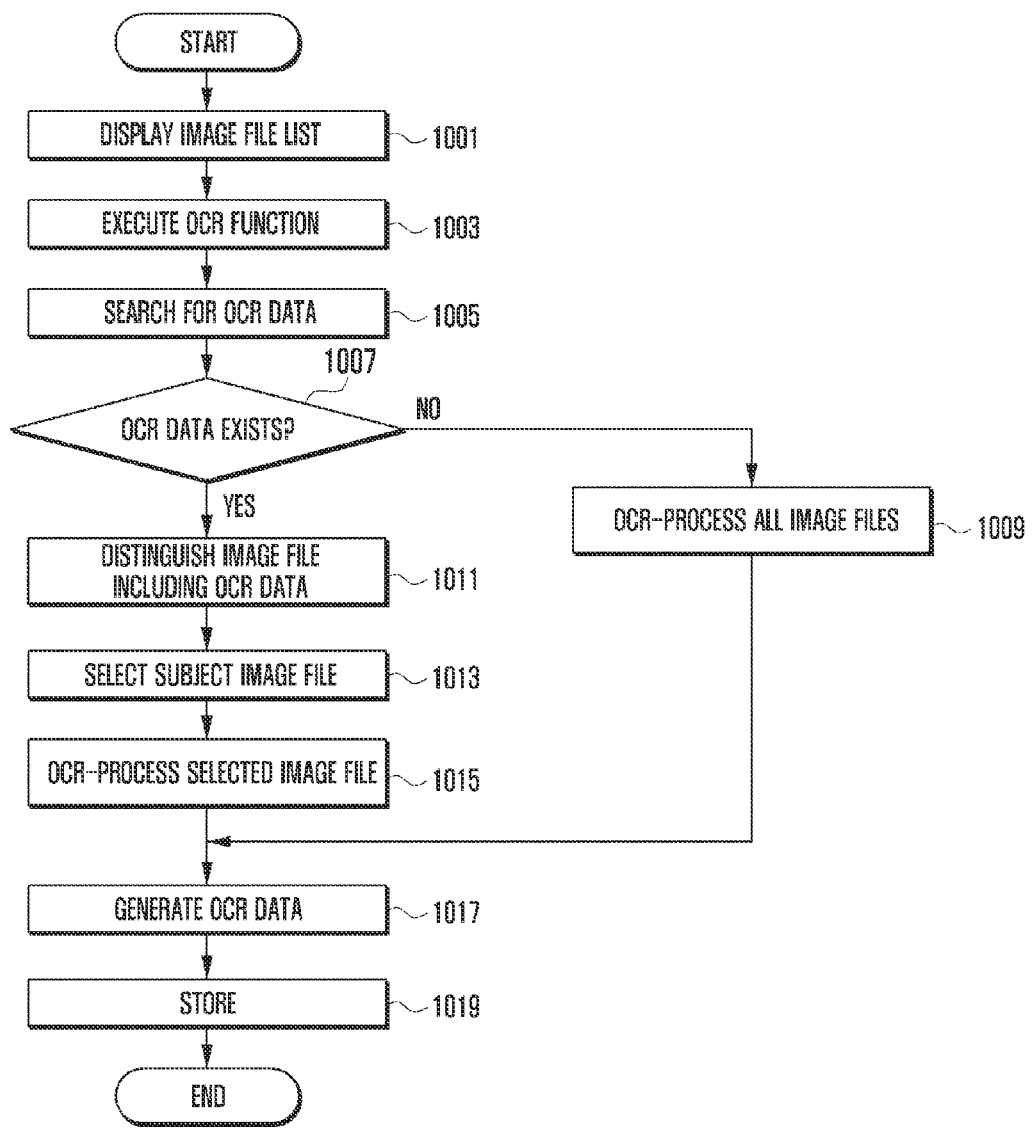

FIG. 10 is a flowchart which illustrates a method for operating an OCR function in a user device, according to an exemplary embodiment.

In particular, FIG. 10 shows an operation example of operating the OCR function based on whether OCR data exists for each image file when a user executes the OCR function for a plurality of image files.

Referring to FIG. 10, in operation 1001, the controller 180 controls a display of the image file list in response to the user's request, and in operation 1003, the controller 180 controls the execution of the OCR function when the execution of the OCR function is requested in a state in which the image file list is displayed. At this time, the execution of the OCR function of FIG. 10 may be performed in response to a command for executing the OCR process for all image files which are included in the image file list.

When executing the OCR function, in operation 1005, the controller 180 may search for the OCR data with respect to each of the image files of the image file list, and in operation 1007, the controller 180 may check whether OCR data which corresponds to the image files exists. Here, the controller 180 may search for OCR data in the file area of each image file and the data area of the storage unit 150, and may check whether respective OCR data exists for each image file.

If OCR data which corresponds to the image files do not exist (as indicated by No with respect to operation 1007), in operation 1009, the controller 180 may perform the OCR process for all image files of the image file list. Further, when the OCR process for all image files is completed, the OCR data corresponding to each image file may be generated in operation 1017 and stored in operation 1019. Here, the controller 180 may sequentially perform generation and storage of OCR data by OCR-processed image files. In this aspect, when the OCR process for a particular image file is completed, the OCR data is stored in either the file area or the data area, based on the size of the OCR data generated for the particular image file, and then the OCR process with respect to the next image file may be performed.

If there is at least one OCR data which corresponds to the image files (as indicated by Yes with respect to operation 1007), in operation 1011, the controller 180 may distinguish image files which include OCR data, and select image files which are to be OCR-processed in operation 1013. In particular, the controller 180 may distinguish the image file which includes OCR data from the image file which does not include OCR data, and may determine the image file which does not include OCR data as a subject image file for performing the OCR process.

In operation 1015, the controller 180 may perform the OCR process for at least one selected image file. Further, when the OCR process for the selected image file is completed, in operation 1017, the controller 180 may generate the OCR data which corresponds to the OCR-processed image files, and in operation 1019, the controller 180 may store the generated OCR data. Here, the controller 180 may generate OCR data by OCR-processed image files and store the generated OCR data in either the file area of the image file or the data area of the storage unit 150 based on the size of the generated OCR data.

Further, though omitted in FIG. 10, when OCR data corresponding to all image files of the image file list respectively exist in the OCR data search, the corresponding guide display may be controlled. For example, the controller 180 may control a guide display of "there is OCR data for all image files. Would you like to execute again?" through a pop-up display, and then perform the OCR process or terminate the OCR function based on the user's selection.

Figure 11:
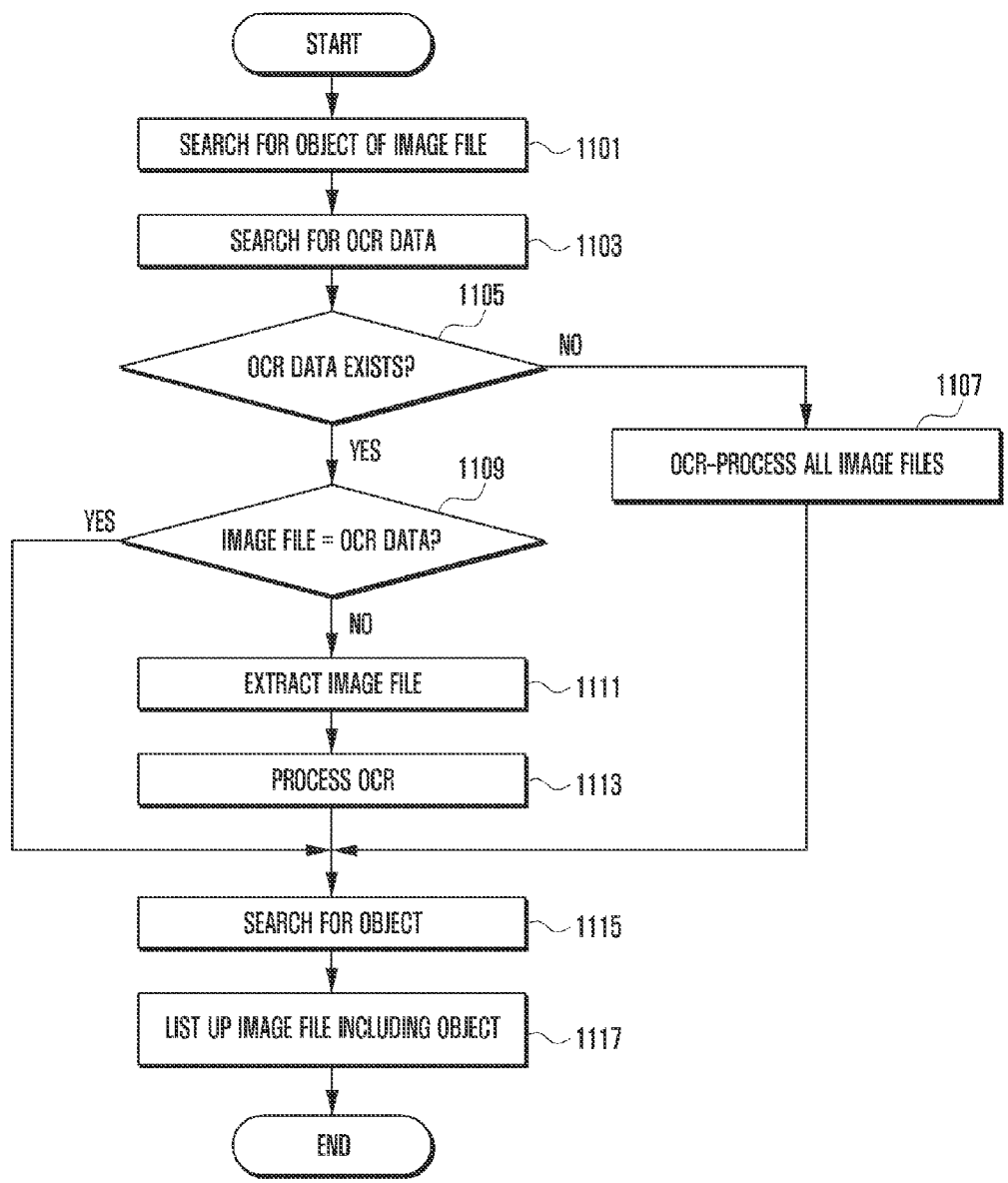

FIG. 11 is a flowchart which illustrates a method for operating an OCR function in a user device, according to an exemplary embodiment.

In particular, FIG. 11 shows an operation example in a case of extracting and listing only image files which include user-desired objects (e.g., a string or a text) from image files which are stored in the user device.

Referring to FIG. 11, in operation 1101, the controller 180 may receive an input which relates to requesting an object search for list-up of an image file which includes a particular object (e.g., a string, a text, etc.) from among a plurality of image files. For example, a user may wish to extract and list only the image files which include the characters "LOVE" from many image files which are stored in the user device. As such, the user may input a request which relates to execution of an object search function of an image file and input a desired search word "LOVE" in a search input window when executing the object search function. The object search function with respect to the image file may be performed by selecting a search option via a menu operation in the image file list as described above.

When the object search is requested based on the user's input, in operation 1103, the controller 180 may search for OCR data with respect to a plurality of image files, and check whether OCR data which corresponds to the image files exist in operation 1105. Here, the controller 180 may search for OCR data in the file area and the data area of the storage unit 150 of each image file, and determine whether there is OCR data for each image file.

Figure 13:
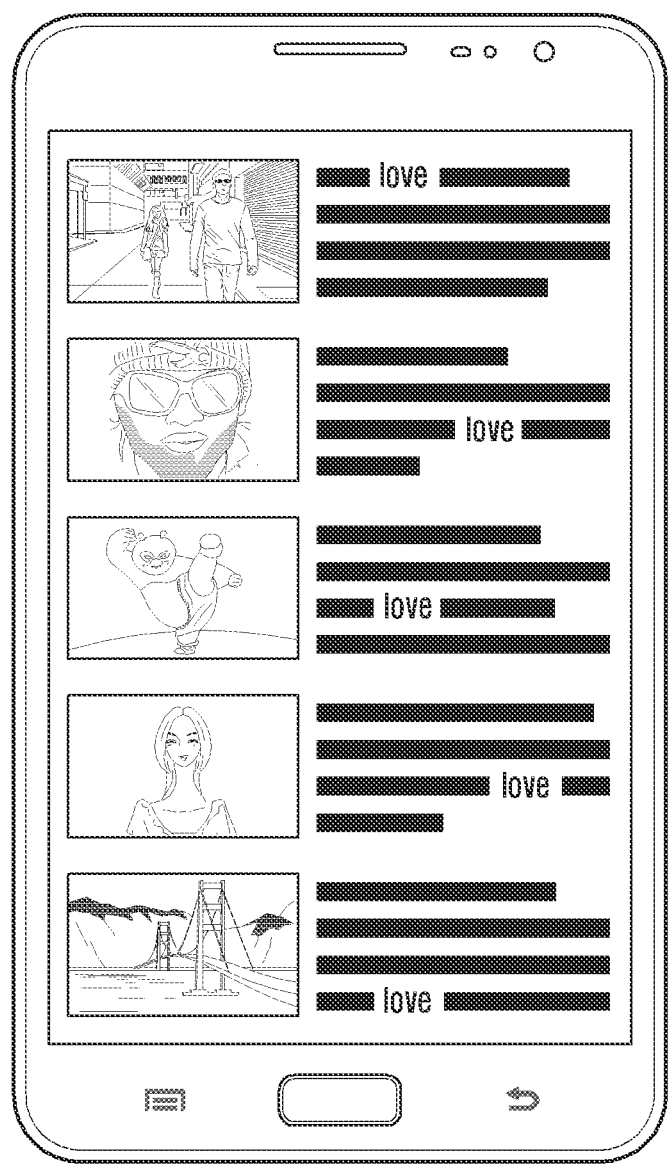
FIGS. 13 and 14 respectively illustrate a screen example in which an image file list is provided in a user device, according to an exemplary embodiment.

If OCR data corresponding to image files does not exist (as indicated by No with respect to operation 1105), in operation 1107, the controller 180 may perform the OCR process for all image files of the image file list. Further, in operation 1115, the controller 180 may parse OCR data which is generated as a result of the OCR process and search for the object (e.g., "LOVE") based on the user's request. Further, in operation 1117, the controller 180 may extract OCR data which includes the object (e.g., "LOVE") from among the OCR data, and list and display at least one image file which corresponds to the OCR data. Here, the listed-up screen example is shown in FIG. 13 which will be described below.

If OCR data corresponding to image files exist (as indicated by Yes with respect to operation 1105), in operation 1109, the controller 180 may determine whether the image files and the searched OCR data have a one to one correspondence (1109). In this aspect, the controller 180 may compare whether there is OCR data for each of all of the plurality of image files.

If the image files coincide with the OCR data (as indicated by Yes with respect to operation 1109), the controller 180 may control the operations described below by jumping to operation 1115 which will be described below.

If the image files do not coincide with the OCR data (as indicated by No with respect to operation 1109), in operation 1111, the controller 180 may extract an image file for which there is no corresponding OCR data. For example, the controller 180 may distinguish the image file which includes OCR data from the image file which does not include OCR data, and extract an image file which does not include OCR data as a subject image file for the OCR process.

In operation 1113, the controller 180 may perform the OCR process with respect to the extracted image file. In particular, the controller 180 may extract an image file which does not include OCR data and perform the OCR function so as to perform the OCR process with respect to the extracted image file.

When the OCR process is completed, in operation 1115, the OCR data that has been previously generated and stored and the OCR data that is generated as a result of performing the OCR process are parsed so that the object (e.g., "LOVE") based on the user's request may be searched. Further, in operation 1117, the controller 180 may extract OCR data including the object (e.g., "LOVE") in the OCR data, and list and display at least one image file which corresponds to the extracted OCR data. Here, the listed-up screen example is shown in FIG. 13.

Figure 12:
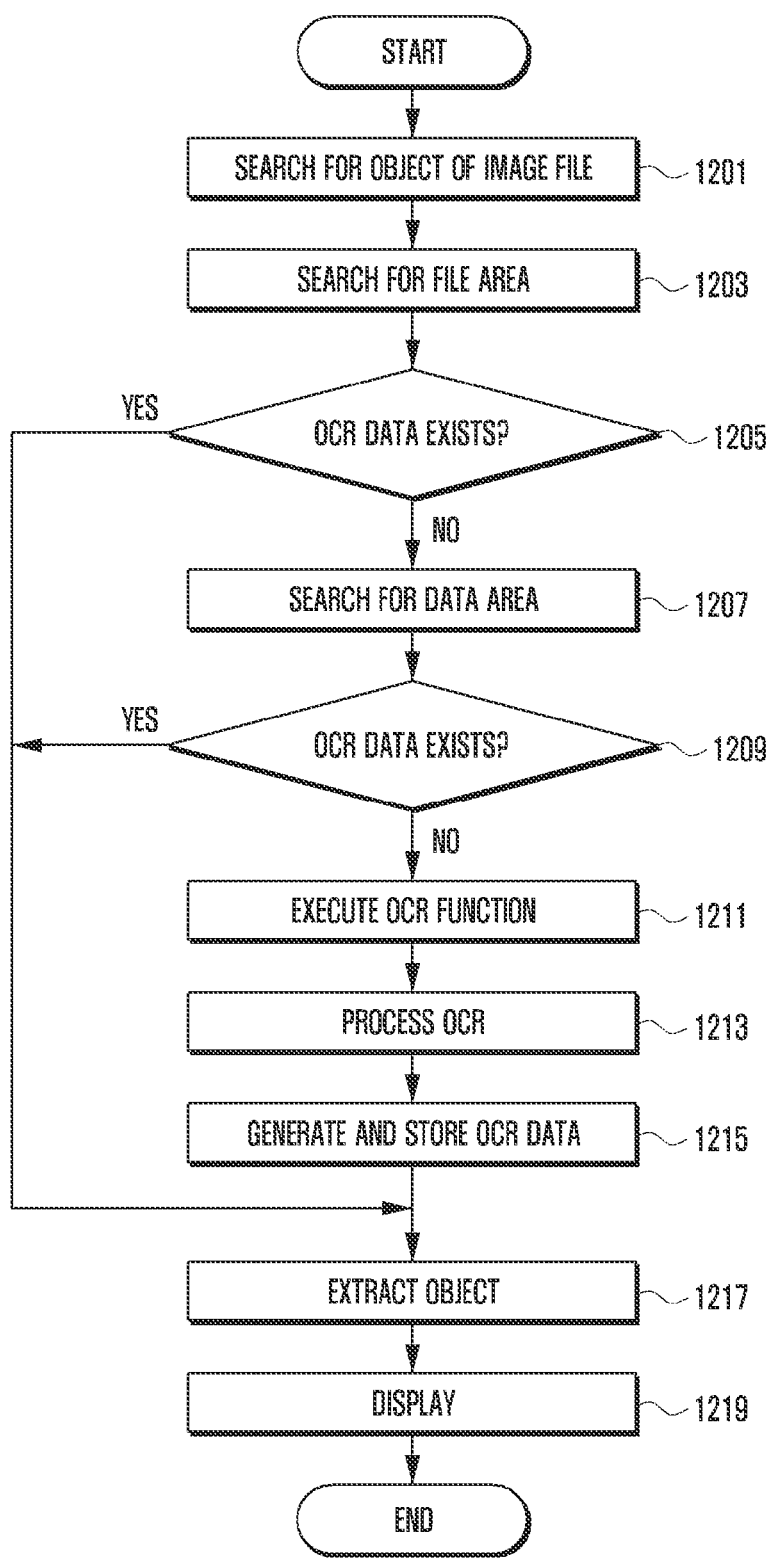

FIG. 12 is a flowchart which illustrates a method for operating the OCR function in a user device, according to an exemplary embodiment.

In particular, FIG. 12 shows an operation example of extracting OCR data which corresponds to a particular image file at the time of a listing, and extracting the object based on the user's request with respect to the extracted OCR data. Here, FIG. 12 illustrates an example of extracting an object with respect to one image file, and an extraction of an object from a plurality of image files as shown in FIG. 11 may be performed according to the procedure of FIG. 12.

Referring to FIG. 12, in operation 1201, the controller 180 may receive an input which relates to requesting an object search for a listing of an image file which includes a particular object (e.g., a string, a text, etc.) from among a plurality of image files. For example, a user may wish to extract only image files which include the characters "LOVE" from among many image files which are stored in the user device, and to list the extracted image files. As such, the user may input a request which relates to an execution of an object search function of an image file and input a desired search word "LOVE" in the search input window at the time of executing the object search function via a menu operation, etc. The object search function with respect to the image file may be performed by selecting a search option via a menu operation from the image file list as described above.

In operation 1203, the controller 180 may check the file area of the image file, and in operation 1205, the controller 180 may determine whether OCR data exists, based on the user's input, when an object search is requested.

If OCR data exists in the file area of the image file (as indicated by Yes with respect to operation 1205), in operation 1217, the controller 180 may extract the object (e.g., "LOVE") based on the user's request from the OCR data. Here, if the object (e.g., "LOVE") is not extracted from the OCR data, the controller 180 may move to step 1203 and perform an object search from the next image file. Further, when the object (e.g., "LOVE") is extracted from the OCR data, it is possible to determine whether the object search process has been performed for all image files. Further, when an object search process has been performed for all image files, in operation 1219, the controller 180 may control a display of a list which includes image files of OCR data including the object (e.g., "LOVE") from among OCR data. Further, when an object search process is not performed for all image files, the controller 180 may temporarily store information which relates to the object-extracted OCR data (or image file), or perform an object search from the next image file by moving to step 1203.

If OCR data does not exist in the file area of the image file (as indicated by No with respect to operation 1205), in operation 1207, the controller 180 may check the data area, and determine whether there is OCR data matched with the image file in operation 1209.

If there is OCR data matched with the image file in the data area (as indicated by Yes with respect to operation 1209), in operation 1217, the object indicated by the user's request (e.g., "LOVE") may be extracted from the OCR data. Here, if the object (e.g., "LOVE") is not extracted from the OCR data, the process is moved to operation 1203 so that the controller may control the execution of the object search in the next image file, and if the object (e.g., "LOVE") is extracted from the OCR data, in operation 1219, the controller may control the display of a list which is composed of image files of OCR data which include the object (e.g., "LOVE") according to the above-described procedure.

If there is no OCR data which corresponds to the image file in the file area and the data area of the image file (as indicated by No with respect to operation 1209), in operation 1211, the controller 180 may execute the OCR function, and execute the OCR process for the image file in operation 1213.

When the OCR process is completed, in operation 1215, the controller 180 may generate and store the OCR data for the image file, and extract the object (e.g., "LOVE") which is indicated by the user's request from the OCR data in operation 1217. Here, if the object (e.g., "LOVE") is not extracted from the OCR data, the controller 180 may control the execution of an object search from the next image file by moving to step 1203, and if the object is extracted from the OCR data, in operation 1219, the controller 180 may control a display of a list composed of image files of OCR data which include the object according to the above-described procedure.

FIG. 13 illustrates a screen example in which an image file list is provided in a user device, according to an exemplary embodiment.

Referring to FIG. 13, FIG. 13 shows a screen example of a user device when an image file which includes an object which is indicated by a user's request is extracted and displayed according to the above-described procedure of FIGS. 11 and 12. For example, if a search command or request with respect to an object is received based on a search word which is inputted by the user, OCR data of the image file are parsed and an image file which includes the requested object (e.g., "LOVE") is extracted, and the list screen of the extracted image file may be provided. As illustrated in FIG. 13, in the list, the thumbnail image which represents the image file and the object (part or whole) of the image file may be provided as one group.

FIG. 14 illustrates a screen example in which OCR data is provided in a user device, according to an exemplary embodiment.

Referring to FIG. 14, FIG. 14 illustrates a screen example of a user device when particular OCR data which is indicated by the user's selection or OCR data which is generated as a result of the OCR process with respect to the image file from among OCR data which is stored in the user device is being displayed.

Further, the screen of OCR data as in FIG. 14 may be displayed when a particular item is selected by the user in a state in which the list is displayed as shown in FIG. 13. In this aspect, when a particular item is selected (touched) from the list, the screen shown in FIG. 13 is converted as shown in FIG. 14. As illustrated in FIG. 14, the COR data may be provided in conjunction with the thumbnail image which corresponds to the image file or the object extracted from the image file. Further, the display of the thumbnail image may be omitted and only the object may be displayed based on the user's selection.

The foregoing exemplary embodiments may be implemented in an executable program command form by various computer means and be recorded in a transitory or non-transitory computer readable recording medium. In this case, the computer readable recording medium may include any one or more of a program command, a data file, and a data structure individually, and/or a combination thereof. In the meantime, the program command which is recorded in a recording medium may be specially designed or configured for one or more of the exemplary embodiments, or be known to a person having ordinary skill in a computer software field to be used. The computer readable recording medium may include any one or more of a Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, and/or a flash memory which stores and executes program commands. Further, the program command includes a machine language code created by a compiler and a high-level language code which is executable by a computer using an interpreter. The foregoing hardware device may be configured to be operated as at least one software module to perform an operation of one or more exemplary embodiments.

As described above, according to a method and apparatus for processing data by using an OCR in accordance with one or more exemplary embodiments, OCR data which corresponds to an image file which is recognized via the OCR function may be stored in a particular area (e.g., a file area or a data area) based on a size of the data. To this end, when trying to obtain an object (a string or text) desired by a user which may be included in many image files which are associated with a user device, the result value may be directly drawn from OCR data which is stored by being matched with the image file without executing the OCR function every time. Hence, when obtaining an object based on a user command and/or a user request in an image file, the user may omit various work processes for generating OCR data which corresponds to the image file. In this manner, a waiting time which relates to a result deduction may be minimized, as an object which is desired by the user and which is included in previously obtained OCR data can be promptly obtainable.

Further, according to the exemplary embodiments, when a user tries to obtain a desired object by executing an OCR function in many image files which have been obtained or which are stored in the user device, or tries to extract only an image file which includes a desired object from among many image files and include the image file in a list, a result value may be quickly drawn and provided.

Hence, according to the exemplary embodiments, a convenience and a competitiveness of a user device may be improved by implementing an optimal environment for minimizing the waiting time when trying to obtain an object via an OCR function in an image file, the convenience to a user may be improved, and the usability may be improved.

Such exemplary embodiments may be simply implemented to all forms of user devices which have an OCR function, and to various devices corresponding thereto.

Although exemplary embodiments have been described in detail hereinabove, it should be clearly understood that many variations and modifications of the exemplary embodiments which may appear to those skilled in the present art will still fall within the spirit and scope of the present inventive concept, as defined in the appended claims.

What is claimed is:

1. A method for processing data by using an optical character reader (OCR), the method comprising:
   obtaining OCR data from each image file of a plurality of image files and storing the obtained OCR data;
   receiving a search command with respect to an object;
   extracting the object from the stored OCR data;
   selecting OCR data which includes the object from among the OCR data; and
   displaying, based on a matching table, a list of image files which correspond to the selected OCR data,
   wherein the matching table includes file information which relates to a particular image file and an address of OCR data which corresponds to the particular image file to match the particular image file with the OCR data corresponding to the image file.

2. The method of claim 1, wherein the obtaining and storing comprises:
   obtaining OCR data which corresponds to an image file from among the plurality of image files;
   comparing a size of the obtained OCR data with a size of a file area of the image file;
   storing the obtained OCR data in the file area when the size of the obtained OCR data is less than or equal to the size of the file area; and
   matching the obtained OCR data with the image file and storing a result of the matching in a data area when the size of the OCR data is greater than the size of the file area.

3. The method of claim 2, wherein the storing the result of the matching in the data area comprises:
   matching file information which relates to the image file with information which relates to an address at which the obtained OCR data is stored, and storing a result thereof such that the file information which relates to the image file is matched with the address of the OCR data which corresponds to the image file.

4. The method of claim 2, wherein the extracting comprises:
   determining whether OCR data which respectively corresponds to each image file of the plurality of image files has been obtained;
   when, for a particular image file, a determination is made that no OCR data has been obtained, performing an optical character reading process with respect to the particular image file in order to obtain OCR data which relates to the particular image file; and
   parsing the obtained OCR data which relates to the particular image file and extracting the object from the parsed data.

5. The method of claim 4, wherein the extracting further comprises:
   determining whether each image file from among the plurality image files corresponds to at least one item of OCR data from among the obtained OCR data;
   if a determination is made that at least one image file does not correspond to at least one item of OCR data from among the obtained OCR data, selecting a subject image file from among the at least one image file;
   performing an optical character reading process with respect to the selected subject image file; and
   parsing OCR data that is previously stored and OCR data that is generated as a result of the performing the optical character reading process, and extracting the object from the parsed data.

6. The method of claim 1, further comprising:
   when a request for performing an optical character reading process with respect to the plurality of image files is received, distinguishing, from among the plurality of image files, a first subset of image files which include OCR data from a second subset of image files which do not include OCR data;
   selecting an image file from among the second subset of image files; and
   performing the optical character reading process with respect to the selected image file.

7. The method of claim 2, wherein the extracting comprises:
   for a particular image file from among the plurality of image files, checking the respective file area to determine whether OCR data which corresponds to the particular image file has been stored; and
   if, for the particular image file, a determination is made that no OCR data which corresponds thereto has been stored, checking the data area to determine whether a result of the matching with respect to the particular image file has been stored in the data area.

8. The method of claim 7, wherein the extracting further comprises:
   if a determination is made that OCR data has been stored in at least one of the respective file area and the data area, attempting to extract the object from the stored OCR data; and
   if a result of the attempting is not successful, performing an object search with respect to a next image file from among the plurality of image files.

9. The method of claim 7, further comprising:
   determining whether an object search process has been performed for all image files from among the plurality of image files if the object has been extracted from the obtained OCR data;
   when a determination is made that the object search process has been performed for all image files, displaying the list of image files which correspond to the selected OCR data;
   accumulating and storing information which relates to OCR data from which the object has been extracted; and
   when a determination is made that that the object search has not been performed for all image files, performing an object search with respect to a next image file from among the plurality of image files.

10. The method of claim 2, wherein the using the OCR to obtain OCR data further comprises performing a corresponding optical character reading process in conjunction with photographing each image file from among the plurality of image files.

11. A user device comprising:
- a display which is configured to display image files, a list of the image files, and a screen interface for facilitating a reception of a user request to search for an object with respect to optical character reader (OCR) data which relate to the image files;
- a storage which is configured to store the image files and to store the OCR data which relate to the image files; and
- a controller which is configured to obtain respective OCR data from each respective image file of the image files, to control the storage to store the obtained respective OCR data, to distinguish OCR data which includes the object from among the stored OCR data when the user request to search for the object is received, and to control the display to display, based on a matching table, a list of image files which correspond to the distinguished OCR data,
- wherein the matching table includes file information which relates to a particular image file and an address of OCR data which corresponds to the particular image file to match the particular image file with the OCR data corresponding to the image file.

12. The user device of claim 11, wherein when, for a particular image file, a size of the respective OCR data is less than or equal to a size of a file area of the particular image file, the controller is further configured to control the storage to store the respective OCR data in the file area of the particular image file, and when, for the particular image file, the size of the respective OCR data is greater than the size of the file area of the particular image file, the controller is further configured to match the respective OCR data with the particular image file and to store the respective OCR data in a data area of the storage.

13. The user device of claim 12, wherein the controller is further configured to distinguish image files which include respective OCR data from image files which do not include respective OCR data, to select an image file from among the image files which do not include respective OCR data as a subject image file, and to perform an optical character reading process with respect to the selected subject image file.

14. A non-transitory computer-readable recording medium having a recorded program that obtains from OCR data from each image file of a plurality of image files and stores the obtained OCR data, distinguishes OCR data which includes an object from among the obtained OCR data when a search command with respect to the object is received, processes, based on a matching table, a display of a list of image files which correspond to the distinguished OCR data, matches respective OCR data with a corresponding image file, and stores a result of the match in at least one of a file area of the corresponding image file and a data area of a storage,
- wherein the matching table includes file information which relates to a particular image file and an address of OCR data which corresponds to the particular image file to match the particular image file with the OCR data corresponding to the image file.

\* \* \* \* \*